Figure 1:
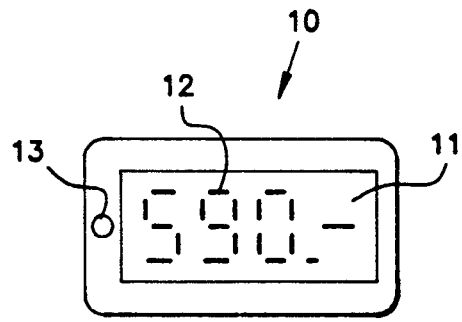

United States Patent [19]
Olsson et al.

[11] Patent Number: 5,313,569
[45] Date of Patent: May 17, 1994

[54] DEVICE FOR MARKING EDGES OF SHELVES

[75] Inventors: Sture Olsson, Västra Frölunda; Roger Ahlm, Linköping, both of Sweden

[73] Assignee: Unigrafic AG, Zurich, Switzerland

[21] Appl. No.: 4,623

[22] Filed: Jan. 14, 1993

Related U.S. Application Data

[63] Continuation of Ser. No. 631,356, Dec. 19, 1990, abandoned, which is a continuation of Ser. No. 273,218, Nov. 18, 1988, Pat. No. 5,019,811, and a continuation of Ser. No. 882,912, Jun. 27, 1986, abandoned.

[30] Foreign Application Priority Data

Oct. 15, 1984 [SE] Sweden .............................. 8405140-8

[51] Int. Cl.$^5$ ............................................. G06F 15/62
[52] U.S. Cl. .................................. 395/118; 340/825.17
[58] Field of Search ............... 395/100, 118, 155, 161; 340/825.17, 825.07, 825.15, 572, 825.35; 455/603, 604, 39; 364/400, 401, 406.01; 235/383, 385; 373/37

[56] References Cited

U.S. PATENT DOCUMENTS

| | | |
|---|---|---|
| 3,049,711 | 8/1962 | Hooper . |
| 3,159,937 | 12/1964 | Barnes . |
| 3,235,713 | 2/1966 | Stern et al. . |
| 3,279,108 | 10/1966 | Cappellari . |
| 3,387,269 | 6/1968 | Herman et al. . |
| 3,633,158 | 1/1972 | Heibel .................... 340/34 |
| 3,637,989 | 1/1972 | Howard et al. ............ 235/383 |
| 3,679,875 | 7/1972 | Rawson et al. . |
| 3,683,389 | 8/1972 | Hollis . |
| 3,699,312 | 10/1972 | Jones et al. . |
| 3,734,311 | 5/1973 | Thompson et al. . |
| 3,735,350 | 5/1973 | Lemelson . |
| 3,774,158 | 11/1973 | Clark . |
| 3,790,006 | 2/1974 | Hartman, III . |
| 3,876,864 | 4/1975 | Clark et al. . |
| 3,920,959 | 11/1975 | Wefers et al. . |
| 3,991,299 | 11/1976 | Chadima, Jr. et al. . |
| 4,002,886 | 1/1977 | Sundelin ................... 235/383 |
| 4,028,537 | 6/1977 | Snow . |
| 4,071,740 | 1/1978 | Gogulski . |
| 4,087,958 | 5/1978 | Ebihara et al. ............ 58/25 |

(List continued on next page.)

FOREIGN PATENT DOCUMENTS

| | | |
|---|---|---|
| 676743 | 12/1963 | Canada . |
| 1179076 | 12/1984 | Canada . |
| 31404 | 7/1981 | European Pat. Off. . |
| 3008338 | 9/1981 | Fed. Rep. of Germany . |
| 3025784 | 2/1982 | Fed. Rep. of Germany . |
| 3135028 | 4/1983 | Fed. Rep. of Germany . |
| 3240030 | 5/1984 | Fed. Rep. of Germany . |
| 1544005 | 4/1979 | United Kingdom . |
| 2041614 | 9/1980 | United Kingdom . |
| 1581836 | 12/1980 | United Kingdom . |
| 2083673 | 3/1982 | United Kingdom . |
| 2120424 | 11/1983 | United Kingdom . |
| 2121586 | 12/1983 | United Kingdom . |
| 2126387 | 4/1984 | United Kingdom . |
| 83/00251 | 1/1983 | World Int. Prop. O. . |

OTHER PUBLICATIONS

"Supermarket" periodical Nr. 7, Aug. 1984.
Elektor Mai 1983, pp. 5-44-5-57.
Elektronik 28/1981, pp. 97-100.
Sennheiser Revue 10. Dan Edition, pp. 71, 78, 79, 80, 82.
Telefunken electronic; A modern infrared remote control system Apr. 1981.

*Primary Examiner*—Heather R. Herndon
*Attorney, Agent, or Firm*—Merchant & Gould, Smith, Edell, Welter & Schmidt

[57] ABSTRACT

A device for indicating prices, article numbers or similar information on the edges of the shelves in department stores or storing premises. The device comprises a number of displays which shall be mounted to the shelves, and each display is connected to a separate electronic control unit and forms together with said unit an operative unit having its own power source. This operative unit is directly or indirectly connected to external control apparatus.

16 Claims, 2 Drawing Sheets

U.S. PATENT DOCUMENTS

| | | | |
|---|---|---|---|
| 4,091,272 | 5/1978 | Richter et al. | 250/199 |
| 4,091,272 | 5/1978 | Richter et al. | |
| 4,139,149 | 2/1979 | Crepeau et al. | 235/383 |
| 4,155,091 | 5/1979 | Vorie . | |
| 4,180,204 | 12/1979 | Koenig et al. | 235/385 |
| 4,218,655 | 8/1980 | Johnston et al. | |
| 4,231,031 | 10/1980 | Crowther et al. | 340/825.63 |
| 4,293,947 | 10/1981 | Brittain . | |
| 4,305,060 | 12/1981 | Apple et al. | 340/825.65 |
| 4,339,772 | 7/1982 | Eilers et al. | 358/144 |
| 4,367,458 | 1/1983 | Hackett | 340/539 |
| 4,399,437 | 8/1983 | Falck et al. | 340/825.54 |
| 4,426,662 | 1/1984 | Skerlos et al. | 358/194.1 |
| 4,438,432 | 3/1984 | Hureum | 340/825.35 |
| 4,438,432 | 3/1984 | Harcum | 340/825.35 |
| 4,473,824 | 9/1984 | Claytor | 340/825.27 |
| 4,500,880 | 2/1985 | Gomersall et al. | 340/825.35 |
| 4,514,631 | 4/1985 | Guscott | 250/342 |
| 4,521,677 | 6/1985 | Sarwin | 235/385 |
| 4,566,034 | 1/1986 | Harger et al. | 358/194.1 |
| 4,703,451 | 10/1987 | Calabrese | 364/900 |
| 4,727,475 | 2/1988 | Kiremidjian | 364/200 |
| 4,888,709 | 12/1989 | Revesz et al. | 340/825.07 |

DEVICE FOR MARKING EDGES OF SHELVES

This is a continuation of application Ser. No. 07/631,356, now abandoned, which is a continuation of application Ser. No. 07/273,218, filed Nov. 18, 1988 now U.S. Pat. No. 5,019,811, continuation of Ser. No. 882,912, filed Jun. 27, 1986, now abandoned.

The invention relates to a device for marking edges of shelves, and more particularly to a device for indicating prices, article numbers, or similar information on the edges of the shelves in department stores and storing premises.

As the commercial marking of goods to an increasing extent is made by using the so-called bar code which can be read electronically and thus facilitates the registration of the purchased goods in the cash register, the common price tag on the goods will be superfluous from a commercial point of view and thus can be dispensed with if this is permitted by the authorities concerned. Then, the marking on the edges of the shelves will be much more important, and for such marking there are used today practically without exception signs which comprise a holder with manually interchangeable figures or other characters. Price changes in the goods assortment, which may occur every day to a great extent as far as everyday commodities are concerned, include an extensive manual work for the shop staff in changing the several signs which, moreover, are disadvantageous, because it is not difficult for a person to change unauthorizedly the information on a sign, if he wishes to do so.

However, according to the periodical Supermarket No. 7-8/84, page 25, an electronic marking for the edges of shelves has been proposed recently, which eliminates the drawbacks of the "manual" shelf edge marking. In that case a display having illuminated digital figures, is provided on the edge of the shelf and can be controlled from the shop computer such that a changed price will be shown immediately and without further manual steps by the display indicating the price of the article for which the price has been changed. The electronic shelf edge marking also permits that there is initiated in a shop a price test or selectively applied price activities during specific selected business hours. However, the electronic shelf edge marking proposed according to said periodical would require for the operation thereof an extensive wiring not least for the power supply of the displays.

Also the device of the invention has been developed for electronic shelf edge marking and comprises a display mounted to the shelf, and a control unit operatively connected to the display.

In order to make possible that the displays are mounted at an arbitrary position, i.e. on the edges of shelves which are disposed along a wall, as well as on the edges of independent shelves (nacelles) without the necessity of an extensive wiring to the individual displays, and also in order to make possible that the displays are controlled, i.e. that the information disclosed by the displays is changed by selective calls from a shop computer or from a portable control device by the transmission of signals via a wireless connection between the displays and the shop computer or control device, respectively, each display having its own call code, the device of the invention has obtained the characteristics appearing from claim 1.

Each independent operative unit of the kind included into the device of the invention can easily be miniaturized by using integrated circuits as far as the control unit included therein is concerned and also can be made very economic as to the power consumption thereof such that the display can be dimensioned practically only with consideration of the desired size of the display, because the rest of the electronic equipment can be made very small. The absence of wiring to the units means a great freedom when the units are to be located, which considerably facilitates the exposure of the goods assortment.

Figure 2:
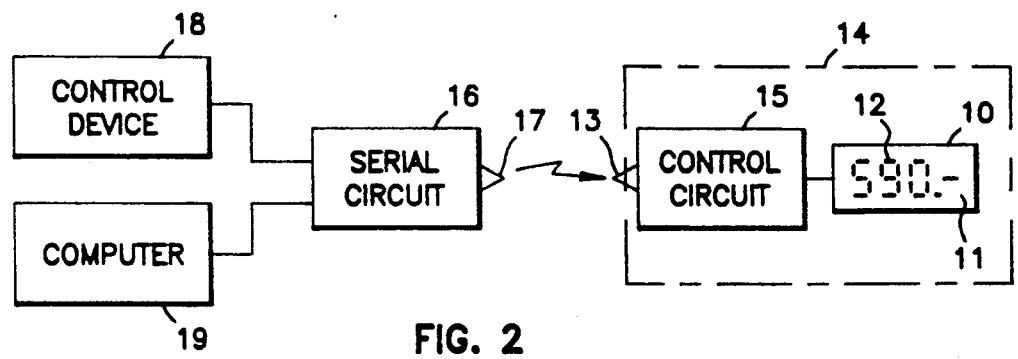
Figure 3:
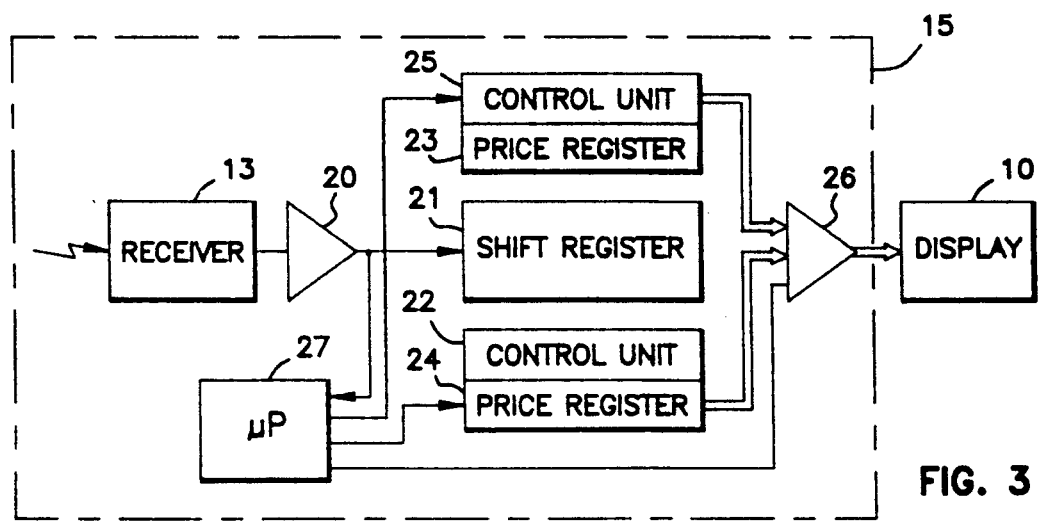
Figure 4:
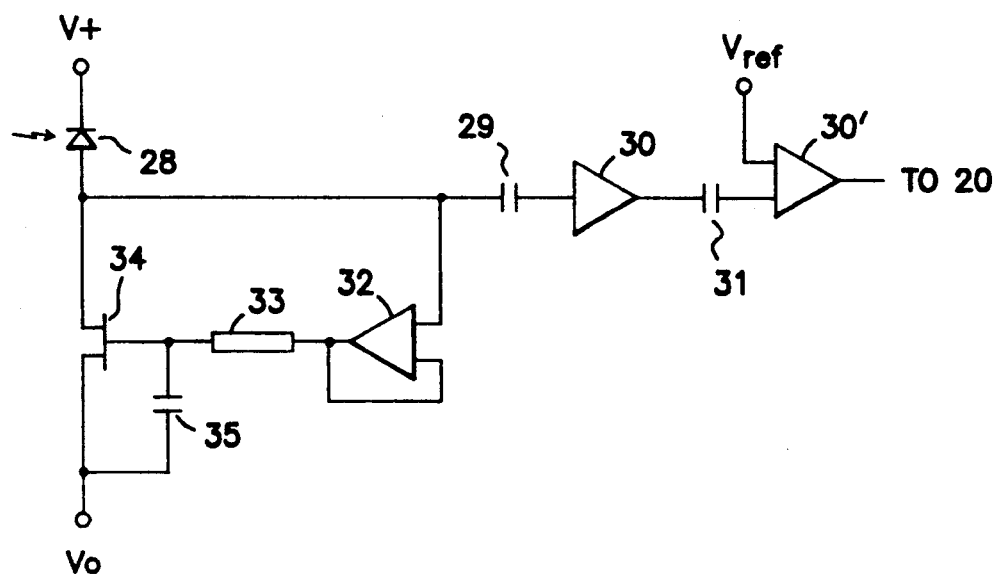
Figure 5:
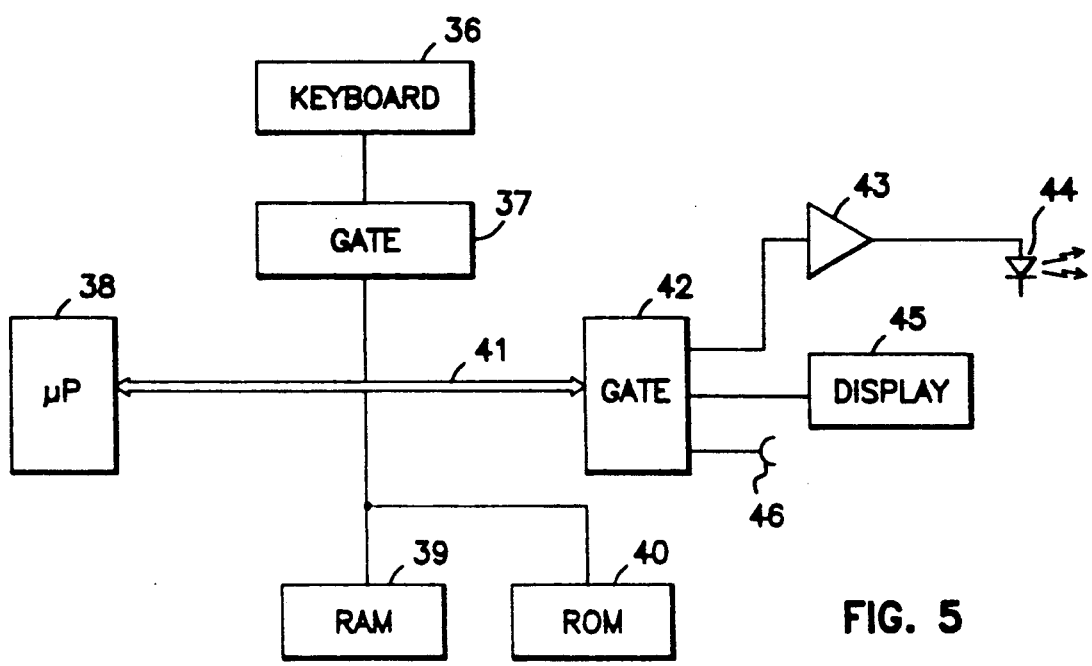

In order to explain the invention in more detail reference is made to the accompanying drawings in which FIG. 1 is a front view of a display which can form part of the device of the invention, FIG. 2 is a simple block diagram of the invention, FIG. 3 is a block diagram over one of the independent operative units forming part of the device, FIG. 4 is a circuit diagram over an IR receiver which can form part of the independent operative unit, and FIG. 5 is a block diagram over a portable control unit, a so-called "key", for operating the independent operative units.

In FIG. 1 there is shown an embodiment of a display 10 which can be used in the device of the invention. It is of the type operating with liquid crystals (LCD) and it has a window 11 in which the desired information 12 is shown. This display shall form part of an independent operative unit which includes also electronic equipment for controlling the information 12, i.e. for changing this information or replacing one piece of information by another one. In the preferred embodiment, this unit is controlled by wireless control from a control unit, and therefore it has a receiver 13 on the front side thereof. The display 10 shall be provided with suitable means for removably or permanently attaching said display on the edge of a shelf, but such means are not shown herein, because they can be constructed in a known manner and must be adapted to the shelves on which the display is to be mounted In FIG. 2 to which reference now is made, the device of the invention is shown broadly as a generic block diagram. In this diagram, the display is shown again and due to the fact that the display has been located in a rectangle indicated by dot and dash lines 14, within which there is also a block 15, it has been indicated that the display and the block form together a unit which can be included entirely in the housing of the display. The block 15 represents an electronic control unit which is connected to the display for the control thereof, and this control unit is provided with the receiver 13 mentioned above. Signals are transmitted to the control circuit 15 via the receiver 13 from a circuit 16 for serial transmission via a transmitter 17, and a control device 18 is connected to the circuit 16, said device comprising principally a microcomputer and can be constructed as a portable unit, a so-called key, the appearance of which resembles a minicomputer or a remote control for TV sets. Alternatively, there can be connected to the circuit 16 a shop computer 19 which controls also existing cash registers. The circuit 16 with the transmitter 17 preferably is combined with the control device 18 to form a unit therewith. The circuit 16 can also be included in the shop computer 19 or it can also be connected with said computer via a cable.

It is possible to exclude the transmitter 17 and the receiver 13 and to connect all units 14 with the circuit 16 via cables, but this leads to a rather complicated and cumbersome arrangement of the displays. Instead it is preferred to arrange the operative connection between the control unit 15 and the circuit 16 as a wireless connection either as a radio connection or as an IR connection, said latter connection operating with infra-red light. In order to guarantee a safe connection between the control unit 15 and the several displays and the shop computer 19 it may be necessary to connect several transmitters 17 to the circuit 16 via cables, said transmitters being located at different positions in the storing premises in order that the control units 15 of all displays can be reached via the wireless connection and no one thereof being located in a "shadow". Several circuits 16 then can be arranged in parallel, and these circuits can either be connected in parallel to the shop computer 19 or form part of a unit together with the control device 18. In that case several control devices can be provided for controlling the displays FIG. 3 discloses in more detail how the control unit 15 with the receiver 13 is constructed. The receiver 13 which is assumed to be an IR receiver and shall be described in more detail below, is connected to an amplifier and a decoder 20 the output signal of which is supplied to a serial shift register 21. To this register there is connected a 64 bits register 22 which is a price register, and a 64 bits register 23 which shall be termed a name register herein and serves the purpose of storing information which can be used for identifying the several displays by the article number or position number. Each of the registers 22 and 23 has a control circuit 24 and 25, respectively, which is connected to an output circuit 26. All registers and the output circuit 26 are connected to a microprocessor 27. The output circuit 26 forms an exciter for the display 10.

The control unit 15 can be made on a single chip according to CMOS technique so that it will be extremely small and above all will have a very low power consumption. As a consequence thereof it can easily be mounted inside the housing of the display 10 and it can be supplied from a power source which comprises a battery of the same type as is used in electronic wristwatches. Thus, it is the intention that each unit 14 shall be an independent operative unit provided with its own power source, which in case of wireless control requires no cable connection whatsoever with a power source or the control unit.

The circuit 16 comprises a gate with a pulse modulator and thus can be included in the shop computer 19. The circuit is used for single-way communication of data to the unit 14, and the data to be communicated or supplied to the circuit 16 from the key 18 or from the shop computer 19. The circuit can operate with pulse width modulation and shall transmit signals with a call code for the identification of a specific display and thus selective call thereof and signals containing information which shall be shown by the related display.

It is assumed that the display shows a price, 590.-, and that no signal is supplied from the transmitter 17 to the receiver 13. Then, the display shows a price of the article which is available on the shelf provided with the display, and this price is stored in the register 22. The control unit 15 is controlled from the unit 18 and/or 19 via the circuit 16 and the wireless link 13, 17, digital signals in the binary system being supplied from the unit 18 or 19 to the circuit 16 which converts these signals to a pulse width modulation. Via the link 13, 17 the pulse width modulated signal is transmitted to the control unit 15. In this unit, the pulse width modulated signal is decoded in the amplifier 20 in order to reproduce the original digital signal which is supplied to the shift register 21 wherein the signal is stored for future use. The microprocessor 27 ranges the incoming signals such that they are supplied to the price register 22 or the name register 23 and from these registers are supplied to the output circuit 26 via the control circuit 24 and 25, respectively. As mentioned, the actual price is stored in the price register 22, and in the same manner the article or position number is stored in the name register 23, said article or position number being unique for the related display and serves as the selective call of said display. The normal condition of the display is that the price is shown continuously, but if a predetermined signal is supplied from the unit 18 or 19, it can be achieved by means of the microprocessor 27 that the article or position number stored in the register 23 instead is shown on the display 10, and if the microprocessor comprises a computer, the article or position number can be shown only for a certain period, the display then returns to show again the programmed prices.

If a new price now is to be programmed on a specific display which represents a specific article or position number, a digital signal will be supplied from the unit 18 or 19, said signal representing article number and price. Then, the microprocessor 27 of all units 15 will effect a comparison between the article number stored in the register 23 and the article number decoded in the unit, and only in case of the related number being stored in the register 23, the microprocessor 27 will provide continued ranging of the incoming signals, the signal which represents the new price being stored in the register 22. From this register the signal is ranged to the display to be shown thereby. In a similar manner there can be obtained by supplying a signal from the unit 18 or 19 a change of the article or position number for a specific display by storing a specific number in the register 23.

Both the pulse width modulation and the register system of FIG. 3, controlled by the microprocessor, are previously known and therefore there would be no difficulties for the man skilled in the art to build up the unit 15 for the function described. This unit accordingly will not be described in detail here. However, the circuit required for the reception of IR signals, which according to the invention is of a specific kind so as to have a minimum sensitivity to surrounding light, will be described in more detail with reference to FIG. 4.

The circuit shown in FIG. 4 includes a photodiode 28 for the reception of the transmitted IR signal and the conversion of this signal to an electric signal. The electric signal is transmitted via a condenser 29 forming a high pass filter for low frequency, to an amplifier 30 which in turn is connected via a condenser 31 to an amplifier 30' for adaption of the output level to the amplifier 20 arranged as a decoder. In order to remove background noise from the transmitted signal a specific circuit is provided which comprises an amplifier 32 connected via a resistor 33 to a field effect transistor 34, a condenser 35 being connected in parallel with said transistor.

In FIG. 5, a block diagram over the control device 18 is shown. This device comprises a keyboard 36 connected to an input and output gate (interface) 37. The keyboard is connected via the gate 37 to a microprocessor 38 having a RAM (operating memory) 39 and a ROM (program memory) 40. The microprocessor is connected over a data and address bus 41 to an input and output gate (interface) 42 to which is connected also an amplifier 43 which supplies an LED 44 for IR radiation. Also a display 45 for showing the signals supplied by the control device can be connected to the gate 42, and moreover this gate can be provided with a connection 46 for external input signals or for the supply of signals e.g. to a shop computer.

As is clear from the description above, it is possible in the device of the invention to operate a display by selective call either from the so-called key or from the shop computer. If the operation is effected by means of the key, this is directed towards the display to be operated such that an IR connection will be established between the key and the display. Then, the procedure described above is followed in order to show the article or position number or to change said number or price.

If a shop computer is connected to the device of the invention, an article register based on the shelves of the shop must first be established in the computer. Each shelf is assigned a specific position number which is then registered in the shop computer. When it is desired to change an article price, a question is put to the computer which rapidly searches for the location of the shelf and changes the price.

As far as the electronic construction of the device of the invention is concerned, there would be great possibilities of making this design according to other principles than indicated herein. It is also possible to use different types of displays, but a display of the type LCD is preferred due to the low power consumption thereof. Essential according to the invention is that a large portion of the electronic system can be made as an integrated circuit on a chip and can be located in a common housing together with the display for attachment to the edge of the shelf as an independent operative unit having its own power source.

We claim:

1. Device for indicating prices, article numbers or similar information on the edges of the shelves in department stores and storing premises, comprising a display mounted to the shelf, and a control unit operatively connected to the display, characterized in that each display is connected to a separate electronic control unit and forms together with said unit a self-contained operative unit having its own power source, which can be connected directly or indirectly to external control apparatus.

2. A method for displaying product information at locations proximate to associated products, comprising the steps of:
   mounting a plurality of electronic display modules at locations proximate to respective different goods;
   programming each module with a module address;
   forming a signal comprising address and data parts, the address part representing a module address and the data part representing product information for the module address;
   aerially broadcasting said signal as electromagnetic energy selected from the spectral band consisting of infrared and light to the modules from a remote transmitter;
   receiving said signal by a plurality of receiving modules, the receiving modules comprising at least some of the electronic pricing modules;
   decoding the address part of said signal by each receiving module into a received address;
   comparing the received address to the module address for each receiving module;
   matching the received address to the module address in at least one addressed module among the receiving modules;
   for each addressed module, decoding the data part of the signal into product information;
   displaying the stored product information on a display of the addressed module responsive to the step of matching; and
   displaying on each module information that changes less often than said product information.

3. The method of claim 2, where in said information that changes less often comprises a product label mounted on the module.

4. A method for displaying product information at locations proximate to associated products, comprising the steps of:
   mounting a plurality of electronic display modules at locations proximate to respective different goods;
   programming each module with a module address;
   forming a signal comprising address and data parts, the address part representing a module address and the data part representing a module address and the data part representing product information for the module address;
   aerially broadcasting said signal as electromagnetic energy selected from the spectral band consisting of infrared and light to the modules from a remote transmitter;
   receiving said signal by a plurality of receiving modules, the receiving comprising at least some of the electronic pricing modules;
   decoding the address part of said signal by each receiving module into a received address;
   comparing the received address to the module address for each receiving module;
   matching the received address to the module address in at least one addressed module among the receiving modules;
   for each addressed module, decoding the data part of the signal into product information;
   displaying the stored product information on a display of the addressed module responsive to the step of matching;
   transmitting a universal address from a programming module moved to near a selected module;
   transmitting a module address from said programming module to said module after transmitting the universal address, such the nonselected modules do not receive the module address;
   recognizing said universal address by said modules; and
   accepting said module address by said module and storing said module address for comparison with later a received address decoded from said signal.

5. A method for electronically displaying product information in different spatial zones using a single display module, comprising the steps of:
   encoding first product information into a first infrared signal;
   encoding an address into the first infrared signal;
   broadcasting the first infrared signal from a remote transmitter into a first zone;
   encoding second product information into a second infrared signal;
   broadcasting the second infrared signal into a second zone;
   receiving the first signal in the first zone by a self-contained electronic display module;

decoding the first signal;

comparing the decoded address in the first signal to an address of the module;

storing and displaying the first product information by the module responsive to matching the module address with the address in the first signal;

moving the module from the first zone to the second zone;

receiving the second signal in the second zone by the module;

decoding the second signal;

comparing the decoded address in the second signal to the module address; and storing and displaying the second product information by the module responsive to matching the module address with the address in the second signal.

6. A system for electronically displaying product information comprising:

at least one electronic display module for displaying product information disposed in an area including at least first and second zones;

means for programming said module with a module address;

means for forming first and second signals, the first signal comprising an address part and a first data part, the address part representing a module address and the first data part representing first product information for the module address, the second signal comprising said address part and a second data part representing second product information;

remote means for aerially transmitting the first and second signal as pulsed electromagnetic energy selected from the band consisting of infrared and light respectively to the first and second zones;

said module having means for receiving the signal, means for decoding the address part of the signal into a received address, and means for comparing the received address to the module address;

said module further comprising means for decoding the data part of the signal into product information, said module further including means for storing and means for displaying the decoded product information responsive to obtaining a match between the received address and the module address;

said module initially disposed in said first zone and decoding a received address from said address part, decoding said first data part into said first product information, and comparing said received address with its module address, said module storing and displaying the first product information responsive to matching the received address with its module address; and said module operable to be moved into said second zone, said module then decoding said received address from said address part, decoding the second data part into said second product information, comparing the address part to its module address, and storing and displaying said second product information responsive to matching the received address with it module address.

7. The system of claim 6, and further including a plurality of modules similar to said module, at least some of said module, at least some of said modules movable between said first and second zones.

8. The system of claim 6, wherein ones of said modules are programmed with different module addresses, said ones of said modules responsive to respective different signals each including different address parts.

9. A system for electronically displaying product information comprising:

a plurality of electronic display modules mounted at locations proximate to respective different products;

means for programming each module with a module address;

means for forming a signal comprising an address part and a data part, the address part representing a module address and the data part representing product information for the module address;

remote means for serially transmitting signal as pulsed electromagnetic energy selected from the band consisting of infrared and light to the modules;

each module having means for receiving signal, means for decoding the address part of the signal into a received address, and means for comparing the received address to the module address;

each module further comprising means for decoding the data part of the signal into product information, each said module further including means for storing and means for displaying the decoded product information responsive to obtaining a match between the received address and the module address; and each module being capable of alternately displaying product information relating to price with other product information.

10. A system for electronically displaying product information comprising:

a plurality of electronic display modules mounted at locations proximate to respective different products;

means for programming each module with a module address;

means for forming a signal comprising an address part and a data part, the address part representing a module address and the data part representing product information for the module address;

remote means for aerially transmitting the signal as pulsed electromagnetic energy selected from the band consisting of infrared and light to the modules;

each module having means for receiving the signal, means for decoding the address part of the signal into a received address, and means for comparing the received address to the module address;

each module further comprising means for decoding the data part of the signal into product information, each said module further including means for storing and means for displaying the decoded product information responsive to obtaining a match between the received address and the module address;

computer means for entering and maintaining price information for a plurality of different products; and said computer means including means for associating product information for each product with an address thereof, said associated product information and address input to said means for forming said signal.

11. A system for electronically displaying product information comprising:

a plurality of electronic display modules mounted at locations proximate to respective different products;

means for programming each module with a module address;

means for forming a signal comprising an address part and a data part, the address part representing a module address and the data part representing product information for the module address;

remote means for aerially transmitting the signal as pulsed electromagnetic energy selected from the band consisting of infrared and light to the modules;

each module having means for receiving the signal, means for decoding the address part of the signal into a received address, and means for comparing the received address to the module address;

each module further comprising means for decoding the data part of the signal into product information, each said module further including means for storing and means for displaying the decoded product information responsive to obtaining a match between the received address and the module address;

said remote means comprising a transmitter and a receiver/transmitter operable to receive said signal from said transmitter and to retransmit said signal to at least some of said modules.

12. Device for indicating prices, article numbers or similar information on the edges of the shelves in department stores and storing premises, comprising a display (10) mounted to the shelf, and an external instructing control unit (18) operatively connected to the display, wherein each display (10) is connected to a separate receiving electronic control unit (15) including a microprocessor (27) for controlling the receiving electronic control unit, and a power source forming together with said display, said receiving electronic control unit, and said microprocessor a self-contained operative unit, said external instructing control unit (18) being operatively connected to said self-contained operative unit by a wireless link (13, 17) for transmitting control signals to the unit; that the receiving electronic control unit (15) comprises a chargeable article number register (23) for storing information identifying the article number of the display, and a product price register (22) operatively connected to said microprocessor (27); and said microprocessor (27) is operatively connected to said external instructing control unit (18) by said wireless link (13, 17) to receive control signals and compare said signals with the article number stored in said article number register (23) and to direct said signals transmitted to the display (10) from said external instructing control unit selectively to said article number register (23) for changing article number data stored therein, and to said product price register (22) for changing the price information data stored therein.

13. Device according to claim 12 wherein each of said registers has an associated control circuit connected to a drive stage for the display and a serially operating shift register connected to the registers, said microprocessor being connected to said control circuits.

14. Device according to claim 12 wherein the display comprises a display of the LCD type.

15. Device as claimed in claim 12 wherein the said external instructing control unit is connected to the self-contained operative unit by means of a wireless link (13, 17) of the IR type.

16. Device as claimed in claim 12 wherein said external instructing control unit (18) is connected to a circuit (16) for pulse width modulation of digital signals from the external instructing control unit, and that the self-contained operative unit comprises a circuit (20) for decoding the pulse width modulation.

* * * * *